UNITED STATES PATENT OFFICE.

HANS STEINER, OF VIENNA, AUSTRIA, ASSIGNOR TO JULIUS SCHMID, OF NEW YORK, N. Y.

PROCESS FOR PRODUCING IMITATIONS OF GALALITH, CELLULOID, AND THE LIKE.

1,396,075.                    Specification of Letters Patent.      Patented Nov. 8, 1921.

No Drawing.        Application filed November 26, 1920.    Serial No. 426,603.

*To all whom it may concern:*

Be it known that I, HANS STEINER, manufacturer, residing at Vienna, Austria, have invented certain new and useful Improvements in Processes for Producing Imitations of Galalith, Celluloid, and the like, of which the following is a specification.

This invention relates to a process for producing imitations of galalith, celluloid, ivory, amber, tortoise-shell, burnished steel, artificial resin, mahogany, ebony and the like.

The high price and scarcity of celluloid, galalith or the like, as well as the impossibility of obtaining suitable kinds of foreign woods, render necessary the utilization of home grown woods, which otherwise would not be used for the production of articles of a better quality. When smoothing these home grown woods, soaking them with glue, coating the same with a coloring matter (such as lithopone, zinc-white or the like) and thereafter with cellulose-ester, and allowing them to dry for the subsequent polishing, the whole of the cellulose-ester-coat will be covered with small gas-blisters. The reason for the disadvantageous appearance of these blisters probably resides in that the thin cellulose-ester coat when drying, dissociates, owing to the dampness of the air, and is divided into free acid. For ordinary purposes this partial dissociation of the cellulose-ester is of no consequence, but this is not the case if the coat is applied to mineral-colors. The commercial zinc-white contains traces of zinc-carbonate and the lithopone, sulfid of zinc. However both react with the production of gas (carbonic acid and hydrogen sulfid) upon contact with the acid formed by the dissociation, and these minute gas-blisters are the reason, that the cellulose-ester-coat become blistery. When smoothing and polishing such an article, the gas-blisters are rent open, thus the surface becomes uneven and spotted, while dust and dirt will be collected in the small cavities within a very short time, which renders the article useless, especially if the principal color is white. A similar drawback exists with most of the commercial mineral-colors, the reason being the impossibility of manufacturing colors free from dirty ingredients which are not acted upon by acids, or by forming such carbonates, which are not acted upon by acids, when seasoning the mineral-colors by means of the carbonic acid of the air only. After many experiments it has been found, that the blistery state may be obviated by combining the mineral-color with an excess of varnish (lac) or of a cellulose-ester-solution or its equivalent and by intimately mixing both together by means of a continuous stirring action. Thereby every particle of the color is coated with a homogeneous, water-insoluble and acid proof coat of varnish (lac) or its equivalent. Although the mineral colors are mixed with varnish (lac) or its equivalent, it is well-known that these colors only contain as much of a binding-medium as is necessary for their capacity of spreading. Every excess of the binding medium would render the color too expensive. However such an excess of the binding medium is of the greatest importance for the process according to the present invention. After the articles have been coated with cellulose-ester and dried, the same are quite free of blisters. Now they may be smoothed and polished and have a striking resemblance to real galalith, celluloid and so forth. They are durable and do not soil or become dirty.

Obviously the process according to the invention may be followed on articles of any kind. In the following lines an example of carrying out the present process will be described with reference to the handle of a walking-stick or umbrella.

The wooden handle is smoothed, immersed in glue and well soaked with it. If desired, the gluing may be repeated several times. After drying the glue and smoothing its surface, the handle is coated once or several times with the desired color, which had been intimately mixed with an excess of varnish (lac) or of a cellulose-ester-solution or its equivalent. Before coating the dry coat with a transparent coat, the former is provided with a design or the like. After allowing the same to dry, the cellulose-ester coating is applied, the latter is allowed to dry, thereafter smoothed and finally highly polished.

According to the coloring chosen as the principal color, the kind of the chosen design and the other applied effects and also the coloring of the transparent cellulose-ester coating, a great variety of imitations may be obtained, such as ivory, galalith, amber, celluloid, tortoise-shell, burnished steel, artificial resin, mahogany, ebony and so forth.

Having thus described my invention, what I claim as new and desire to secure by Letters Patent is:

A process for producing imitations of galalith, celluloid and so forth, consisting in soaking a smooth-surfaced piece of wood in glue, coating the same with any desired color which has been intimately mixed with an excess of cellulose-ester, applying any kind of design or effect to it, coating the same with cellulose-ester, smoothing and finally polishing the latter.

In testimony whereof I affix my signature in presence of two witnesses.

HANS STEINER.

Witnesses:
RICHARD KOMINIK,
HELENE MAYER.